United States Patent [19]
Edmiston

[11] 3,959,885
[45] June 1, 1976

[54] TROLLING DEPTHOMETER

[76] Inventor: Glen P. Edmiston, P.O. Box 852, Alleghany, Calif. 95910

[22] Filed: Oct. 2, 1974

[21] Appl. No.: 511,423

[52] U.S. Cl. ............................... 33/126; 33/169 B; 43/25
[51] Int. Cl.² ........................................ G01B 5/18
[58] Field of Search .............. 33/126, 126.5, 169 B, 33/86; 43/25

[56] References Cited
UNITED STATES PATENTS

| | | | |
|---|---|---|---|
| 2,518,907 | 8/1950 | Konwal | 33/126.5 |
| 2,669,785 | 2/1954 | Rydzewski | 33/126.5 |
| 3,149,419 | 9/1964 | Koznarski | 33/126 |
| 3,253,337 | 5/1966 | Ebert | 33/1 LE |
| 3,874,108 | 4/1975 | Connor | 33/126 X |

*Primary Examiner*—Samuel B. Rothberg
*Assistant Examiner*—Michael H. Thaler
*Attorney, Agent, or Firm*—Robert G. Slick

[57] ABSTRACT

A trolling depthometer is provided in the form of a small, clip-on device for fastening to the end of a fishing pole. Preferably, the device is made in two parts so it can be readily disassembled and carried in a tackle box.

2 Claims, 3 Drawing Figures

TROLLING DEPTHOMETER

SUMMARY OF THE INVENTION

In trolling, it is highly desirable that the angler know the depth at which he is fishing. In the past, this has been largely guesswork unless relatively elaborate devices are used. In accordance with the present invention, a small, plastic, clip-on device is provided for a fishing rod or the like. This device will give the angle at which the line is trailing the boat and this, coupled with the knowledge of the length of line which is out, enables one to make a quick trigonometric calculation to show the depth of the bait below the surface. Tables are available for this purpose, and in fact, a suitable table may be printed on the device of the present invention.

I am aware of the fact that others have provided methods of measuring the angle of a line for fishermen such as is taught in U.S. Pat. Nos. 2,669,785, 2,518,907 and 3,149,419. All of these devices are relatively bulky and must be attached to a boat for use. In contrast, the device of the present invention is a simple slip-on device which can be manufactured inexpensively out of plastic. In addition, in a preferred embodiment of the device, the two major parts of the device snap together so that the main parts can be easily unsnapped so the device will lie flat and occupy almost no space in a tackle box or the like.

Various other features and advantages of the present invention will be brought out in the balance of the specification.

DESCRIPTION OF THE PREFERRED EMBODIMENTS

Figure 1:
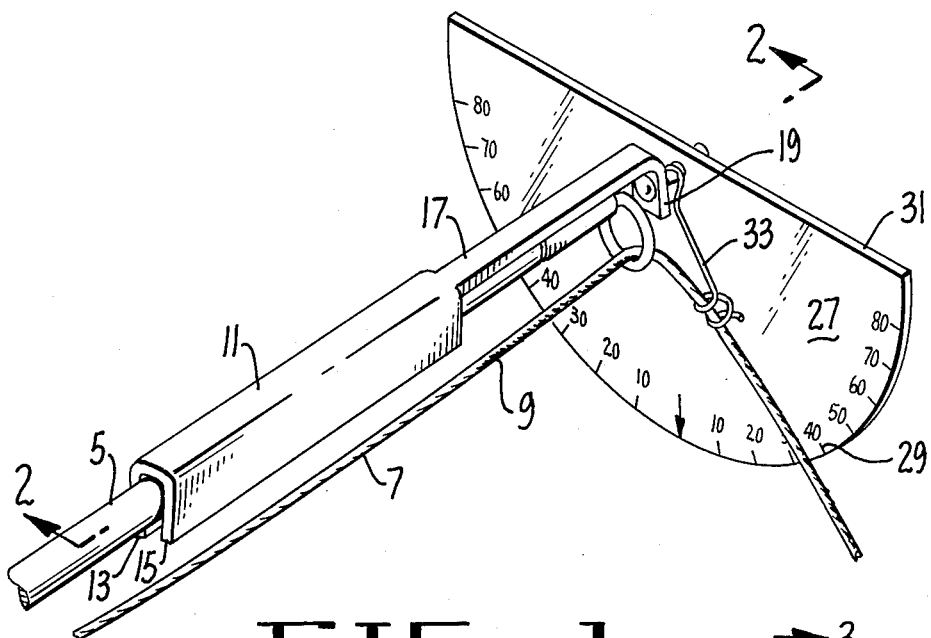
FIG. 1 is a perspective view of a device embodying the present invention.
Figure 2:
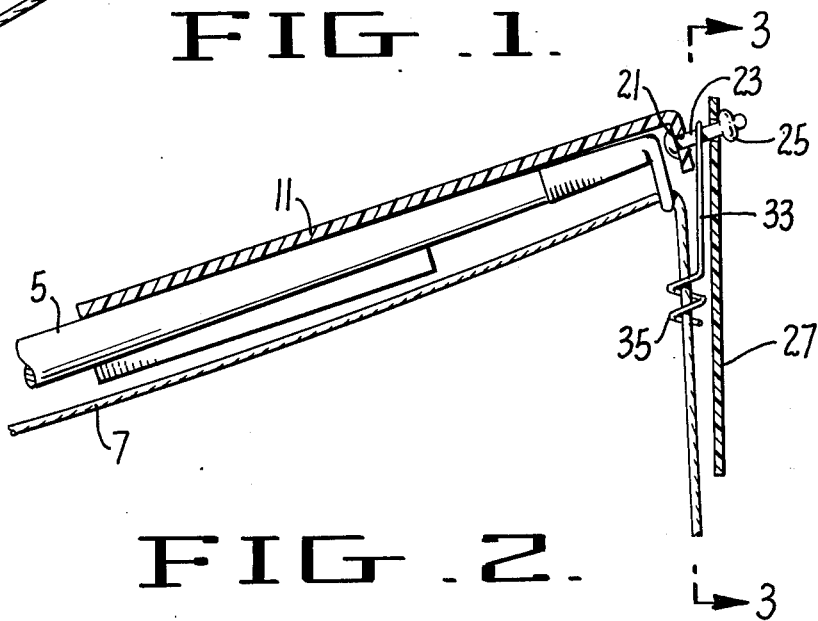
FIG. 2 is a section on the line 2—2 of FIG. 1.
Figure 3:
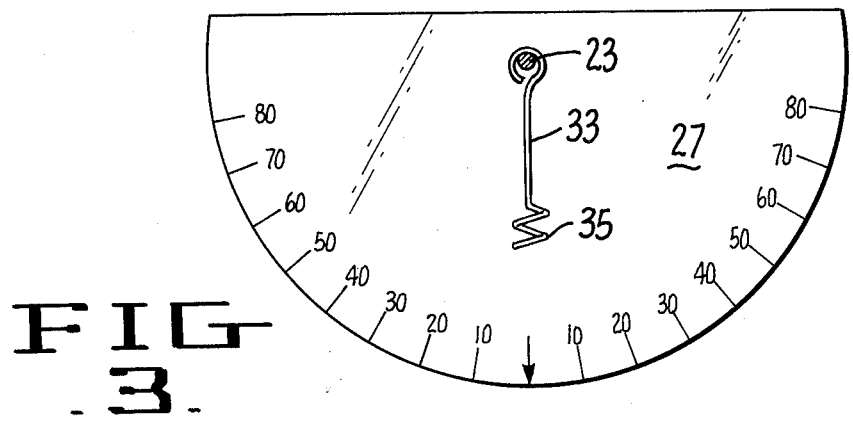
FIG. 3 is a section on the line 3—3 of FIG. 2.

Referring now to the drawings by reference characters, the device of the present invention is adapted to be used near the tip of an ordinary fishing rod 5. In using the device, it will be necessary to know not only the angle at which the line is trailing the boat, but also the length of line which has been payed out. Thus, the device may be used with a color-coded line having alternate sections of the line, such as those designated 7 and 9, of different colors so that the fisherman can tell at a glance how much line he has out. However, other devices can be used to determine the length of the line out such as a gauge on the reel.

The device of the present invention includes a clip 11 of generally U-shaped structure having arms 13 and 15 which fit over each side of the rod. Preferably, the clip is made of a resilient plastic so that it can be merely pushed over the rod and held in place by friction. Alternatively, it could be made of a springy metal. Formed as a part of the clip 11 is an extension 17 having a downturned end 19 with a hole 21 adapted to receive a rivet or bolt 23. The rivet 23 preferably has a bulbous end 25, the purpose of which will be later explained. Suspended on the rivet 23 is a semicircular protractor 27 having the usual degree markings thereon as at 29. Since the protractor 27 is semicircular, it will be self leveling, although it can be weighted to enhance the leveling action. Normally, this is not necessary since the top edge 31 will automatically swing to a horizontal plane due to the shape of the protractor. The line holder 33 is freely pivoted on rivet 23 and this terminates in one or more loops 35 so that one can easily insert or remove the line from the line holder 33. The line holder can be fabricated of ordinary wire. Although the simple loops at the end are highly effective, other attachment means could be employed.

In use, the device is merely clipped to the pole as is shown in FIG. 1 and the line engaged in the loops 35. The pole is held at right angles to the boat and it is easy to read the angle at which the line extends from the boat on the protractor face 27. As was mentioned before, some means is provided, such as the color-coded line, to determine how much line is out so that it is easy to calculate or look up on the table the depth at which one is fishing. Although the device can be left in place while fishing, it would ordinarily be removed from the rod until the angler alters his speed, line length or weight.

Preferably, the protractor 27 is made from a yielding plastic so that the device is easily taken into two parts by pushing the bulbous end 25 through the protractor. Thus, it can be stored substantially flat and will occupy little space in a fishing box and will not be in much danger of getting broken. It is easily assembled for use merely by snapping the protractor back onto the pin 23.

Although a specific embodiment of the invention has been described, it will be obvious to those skilled in the art that many variations can be made in the exact structure shown without departing from the spirit of this invention.

I claim:

1. A depthometer and fishing pole comprising in combination:
   a. a fishing pole having the usual terminal end over which the line passes,
   b. a U-shaped clip adapted to snap over said fishing pole near the terminal end thereon,
   c. an extension arm extending from said clip generally parallel to said pole and terminating beyond the terminal end of said pole, said arm having a fixed, downturned end with a pin in said downturned end,
   d. a semicircular protractor pivoted on said pin, and
   e. a line holder pivoted on said pin whereby said line holder can be snapped onto a line held by the pole and said protractor will indicate the angle at which the line extends.

2. The device of claim 1 wherein said protractor has means whereby it will snap on and off of said pin.

* * * * *